US012059782B2

(12) United States Patent
Turner

(10) Patent No.: US 12,059,782 B2
(45) Date of Patent: Aug. 13, 2024

(54) PAINT ROLLER SLEEVE REMOVAL TOOL

(71) Applicant: Mark Turner, Aberdeen, MD (US)

(72) Inventor: Mark Turner, Aberdeen, MD (US)

( * ) Notice: Subject to any disclaimer, the term of this patent is extended or adjusted under 35 U.S.C. 154(b) by 0 days.

(21) Appl. No.: 18/392,944

(22) Filed: Dec. 21, 2023

(65) Prior Publication Data

US 2024/0157526 A1 May 16, 2024

(51) Int. Cl.
*B25B 27/06* (2006.01)
*B44D 3/00* (2006.01)

(52) U.S. Cl.
CPC .............. *B25B 27/06* (2013.01); *B44D 3/006* (2013.01)

(58) Field of Classification Search
CPC ... B25B 27/06; B44D 3/006; Y10T 29/53952; Y10T 29/49815; Y10T 29/53987
See application file for complete search history.

(56) References Cited

U.S. PATENT DOCUMENTS 2,825,916 A * 3/1958 Basala, Jr. .......... B05C 17/0245 15/236.03
3,019,467 A * 2/1962 Garrett ................... B44D 3/006 15/245
3,436,264 A 4/1969 Allen
4,667,361 A * 5/1987 Wolcott ................. B44D 3/006 15/104.04
4,995,749 A * 2/1991 Gornik ................ B05C 17/0245 401/137
5,115,542 A * 5/1992 Gehres .................. F16L 3/2235 24/339
5,283,923 A 2/1994 Schaedel
5,462,322 A * 10/1995 Berezansky ............ E05C 19/18 292/288
6,976,284 B1 12/2005 Manfredi et al.
10,099,507 B2 10/2018 Grison et al.
2004/0149320 A1* 8/2004 Hutchinson ............ B44D 3/006 134/140
2012/0174946 A1* 7/2012 Young .................... B44D 3/006 134/6
2017/0100959 A1* 4/2017 Grison .................. B44D 3/006

* cited by examiner

*Primary Examiner* — Seahee Hong
(74) *Attorney, Agent, or Firm* — Boudwin Intellectual Property Law, LLC; Daniel Boudwin

(57) ABSTRACT

A paint roller sleeve removal tool for overlying an unwanted roller sleeve to allow a user to remove a soiled roller sleeve without spreading mess undesirably. The paint roller sleeve removal tool includes a primary tubular member having a first primary panel hingedly affixed to a second primary panel. The secondary tubular member is affixed to the primary tubular member, the secondary tubular member having a first secondary panel is affixed to a distal end of the first primary panel and a second secondary panel is affixed to a distal end of the second primary panel. The paint roller sleeve removal tool includes a plurality of protrusions that are affixed to an interior surface of each of the first primary panel, the second primary panel, the first secondary panel, and the second secondary panel.

8 Claims, 6 Drawing Sheets

PAINT ROLLER SLEEVE REMOVAL TOOL

CROSS REFERENCE TO RELATED APPLICATIONS

This application claims the benefit of U.S. Provisional Application No. 63/425,492 filed on Nov. 15, 2022. The above identified patent application is herein incorporated by reference in its entirety to provide continuity of disclosure.

BACKGROUND OF THE INVENTION

Field of the Invention

The present invention relates to a removal tool. More particularly, the present invention pertains to a paint roller sleeve removal tool.

Individuals frequently rely on paint rollers in order to paint relatively large surfaces efficiently and effectively. Such paint rollers include a sleeve of absorbent material that picks-up and stores relatively large quantities of paint therein, wherein the sleeve is disposed over the roller element of the paint roller. The sleeve may then be dipped and rolled into a paint collection tray to load the sleeve with paint. Once the sleeve is loaded, the roller may be applied to the wall surface to be painted and rolled thereacross. As such, the paint may be dispensed from the sleeve onto the desired wall surface.

Typically, when a user is finished painting a relatively large surface with a paint roller, or when the individual roller sleeve is unable to absorb paint effectively, the user must remove the undesired roller sleeve from the paint roller frame. However, at this point, the undesired roller sleeve is loaded with paint, which may create a relatively large mess when trying to remove the roller sleeve. For example, a user may be required to use their bare or gloved hands in order to remove the roller sleeve, thereby spreading paint over their hands. This paint may be relatively easily spread to an undesired surface accidentally. For example, should the user seek to wash their hands immediately after removing the paint sleeve, paint may be spread to the faucet, soap dispenser, and sink area in the process of cleaning. Alternate methods of removing roller sleeves may still spread undesired mess, such as utilizing another object to effectively scrape the sleeve down off of the roller frame or using cloth or paper towels to grip the roller sleeve. In the initial case, the paint loaded onto the sleeve may be spread across the other object, while in the latter case, paint may bleed through the intermediate fabric onto the user's hands negating the effectiveness of the fabric entirely.

In order to address these concerns, the present invention provides users with a paint roller sleeve removal tool for overlying the unwanted roller sleeve to allow the user to remove the soiled roller sleeve without spreading mess undesirably.

SUMMARY OF THE INVENTION

The present invention relates to a removal tool. More particularly, the present invention relates to a paint roller sleeve removal tool.

The paint roller sleeve removal tool comprises a primary tubular member having a first primary panel hingedly affixed to a second primary panel and a secondary tubular member affixed to the primary tubular member, the secondary tubular member having a first secondary panel affixed to a distal end of the first primary panel and a second secondary panel affixed to a distal end of the second primary panel.

It is an object of the present invention to provide a paint roller sleeve removal tool that is used in combination with a relatively large paint roller or a relatively small paint roller.

It is an object of the present invention to provide a paint roller sleeve removal tool that includes a plurality of protrusions that aid in gripping a paint roller sleeve, while an upper lip and a lower lip ensure that the user's hand is retained on the paint roller sleeve removal tool during use.

It is an object of the present invention to provide a paint roller sleeve removal tool that once the soiled paint roller sleeve is removed from the paint roller frame, the soiled paint roller sleeve is disposed of via opening the paint roller sleeve removal tool.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
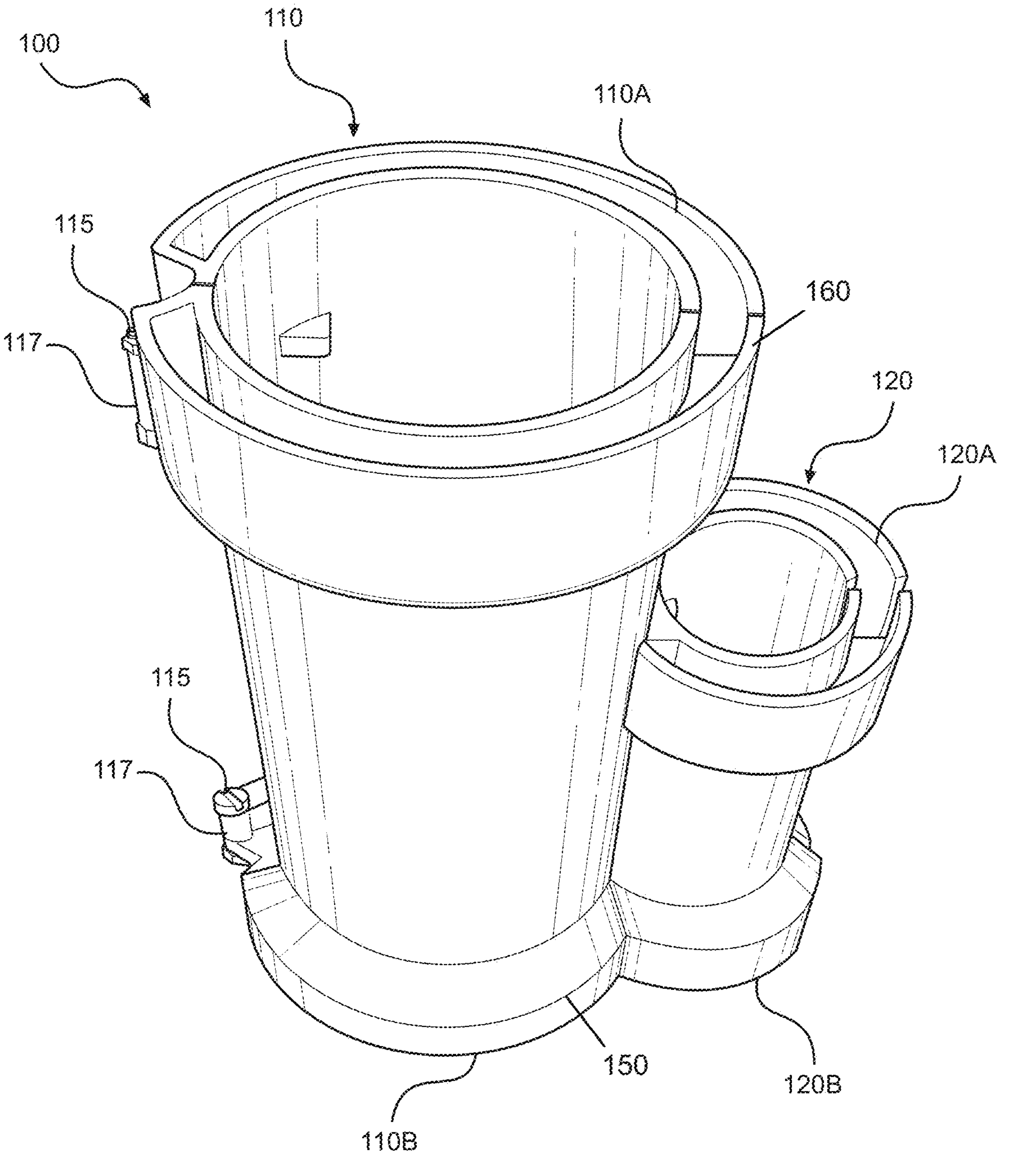
FIG. 1A shows a perspective view of an embodiment of the paint roller sleeve removal tool in a closed position.
Figure 1B:
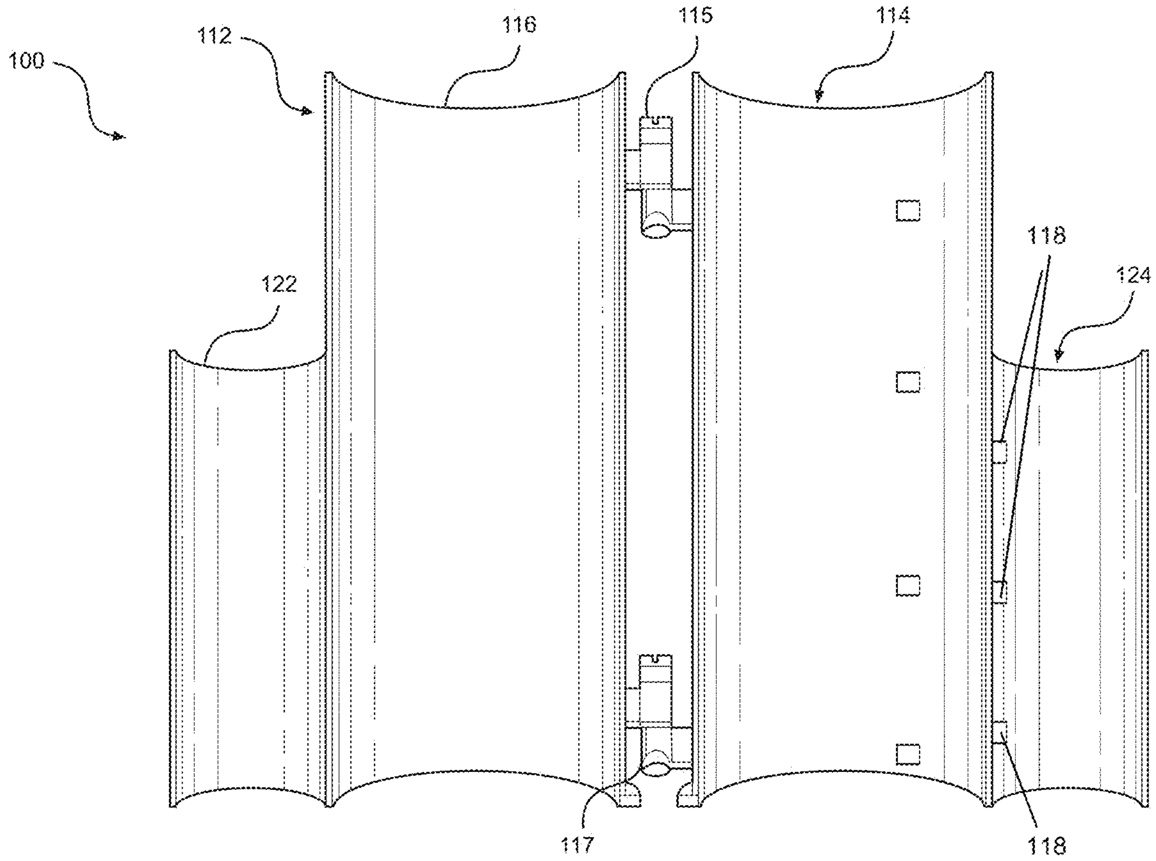
FIG. 1B shows a perspective view of an embodiment of the paint roller sleeve removal tool in an open position.

Referring now to FIGS. 1A and 1B, there is shown a perspective view of an embodiment of the paint roller sleeve removal tool 100 in an open position and a perspective view of an embodiment of the paint roller sleeve removal tool 100 in a closed position, respectively.

Figure 1C:
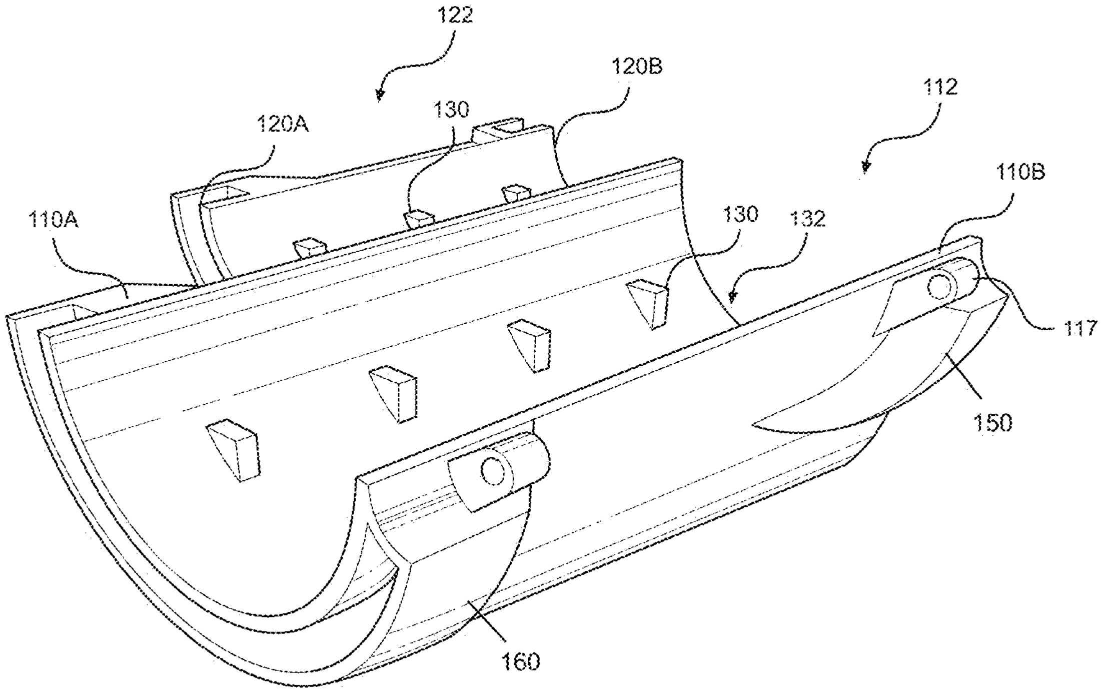
FIG. 1C shows a perspective view of an embodiment of a first primary panel and a second primary panel of the paint roller sleeve removal tool.
Figure 1D:
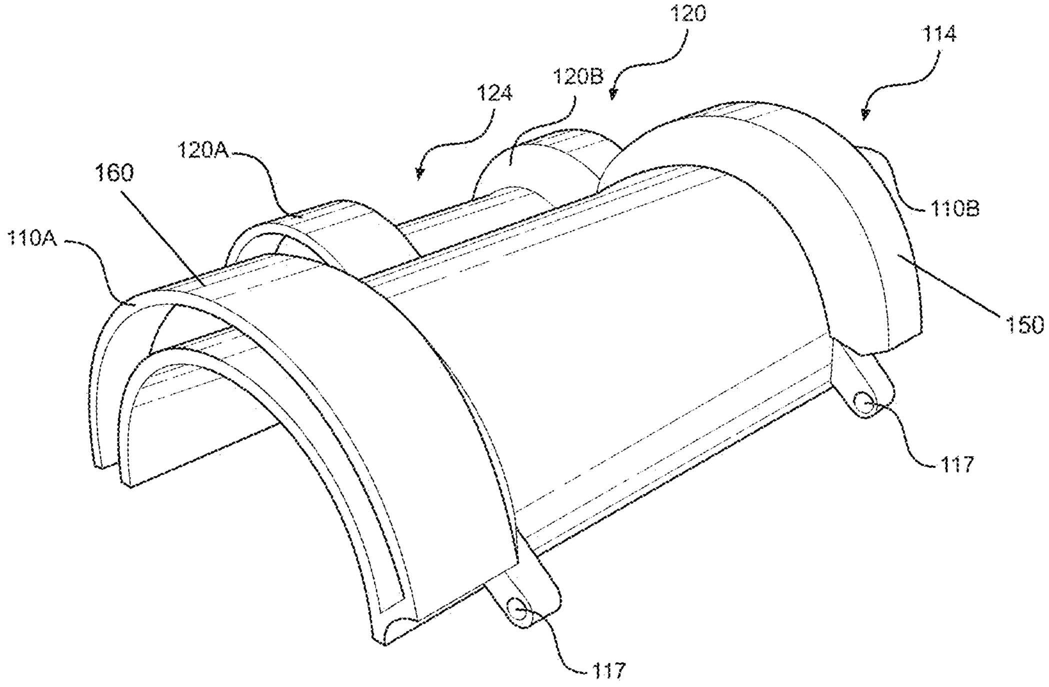
FIG. 1D shows a perspective view of an embodiment of a first secondary panel and a second secondary panel of the paint roller sleeve removal tool.

Referring now to FIGS. 1C and 1D, there is shown a perspective view of an embodiment of the paint roller sleeve removal tool 100 with a first primary panel 112 and a second primary panel 114 and with a first secondary panel 122 and a second secondary panel 124.

The paint roller sleeve removal tool 100 may include a primary tubular member 110 and a secondary tubular member 120.

The primary tubular member 110 may include a first primary panel 112 hingedly affixed to a second primary panel 114. The first primary panel 112 and the second primary panel 114 may include an arcuate panel 116 or the like, such that when the first primary panel 112 and the second primary panel 114 are disposed in a closed position (as shown in FIG. 1A), the first primary panel 112 and the second primary panel 114 may define the primary tubular member 110. The primary tubular member 110 may include a widened first end 110A and a widened second end 110B.

The widened first end 110A and the widened second end 110B may be double-sided or the like. The first primary panel 112 may be hingedly affixed to the second primary panel 114 with a screw 115 inserted through a pair of extended apertures 117 extending from the first primary panel 112 and the second primary panel 114.

The secondary tubular member 120 may be affixed to the primary tubular member 110, wherein the secondary tubular member 120 comprises a first secondary panel 122 affixed to a distal end of the first primary panel 112 and a second secondary panel 124 affixed to a distal end of the second primary panel 114. The secondary tubular member 120 may be formed when the primary tubular member 110 is in the closed position. As shown in the illustrated embodiments, the secondary tubular member 120 comprises a diameter less than that of the primary tubular member 110, such that the paint roller sleeve removal tool 100 provides tubular members dimensioned for use with a roller cage 182 of a paint roller frame 180 of various diameters. The secondary tubular member 120 may include a widened first end 120A and a widened second end 120B that are double-sided. The second primary panel 114 may be affixed to the second secondary panel 124 with a plurality of stationary living hinges 118.

In the illustrated embodiment, a plurality of protrusions 130 may be affixed to an interior surface of each of the first primary panel 112, the second primary panel 114, the first secondary panel 122, and the second secondary panel 124, respectively.

The protrusions 130 may extend from an interior surface into a plurality of channels 132 defined by each of the primary tubular member 110 and the secondary tubular member 120, wherein the protrusions 130 are configured to increase the surface area in contact with a paint roller sleeve 140 to increase frictional engagement therewith. In the illustrated embodiment, the protrusions 130 may be distributed across the interior surface in the channels 132. The protrusions 130 may be a plurality of protruding isosceles triangles 130A that may be equally spaced on the plurality of channels 132. Furthermore, in the illustrated embodiment, an upper lip 160 extends radially outwardly from an upper edge of each of the first primary panel 112 and the second primary panel 114. Additionally, in the shown embodiment, a lower lip 170 extends radially outwardly from a lower edge of the first primary panel 112 and the second primary panel 114. The upper lip 160 and the lower lip 150 prevent a user's hand from slipping off of the paint roller sleeve removal tool 100 when the paint roller sleeve removal tool 100 is in use.

Figure 2A:
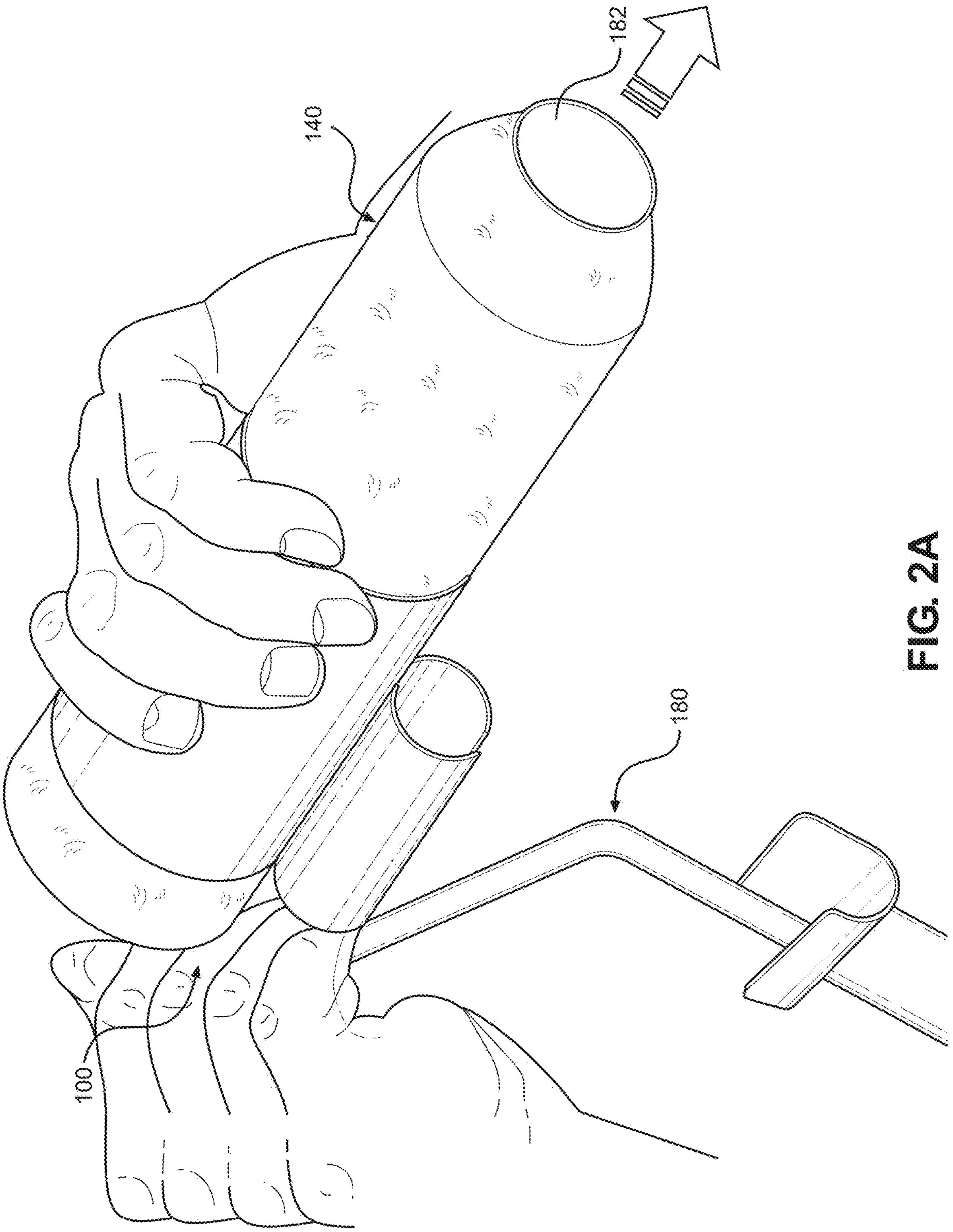
FIG. 2A shows an environmental perspective view of an embodiment of the paint roller sleeve removal tool in use with a relatively large paint roller.
Figure 2B:
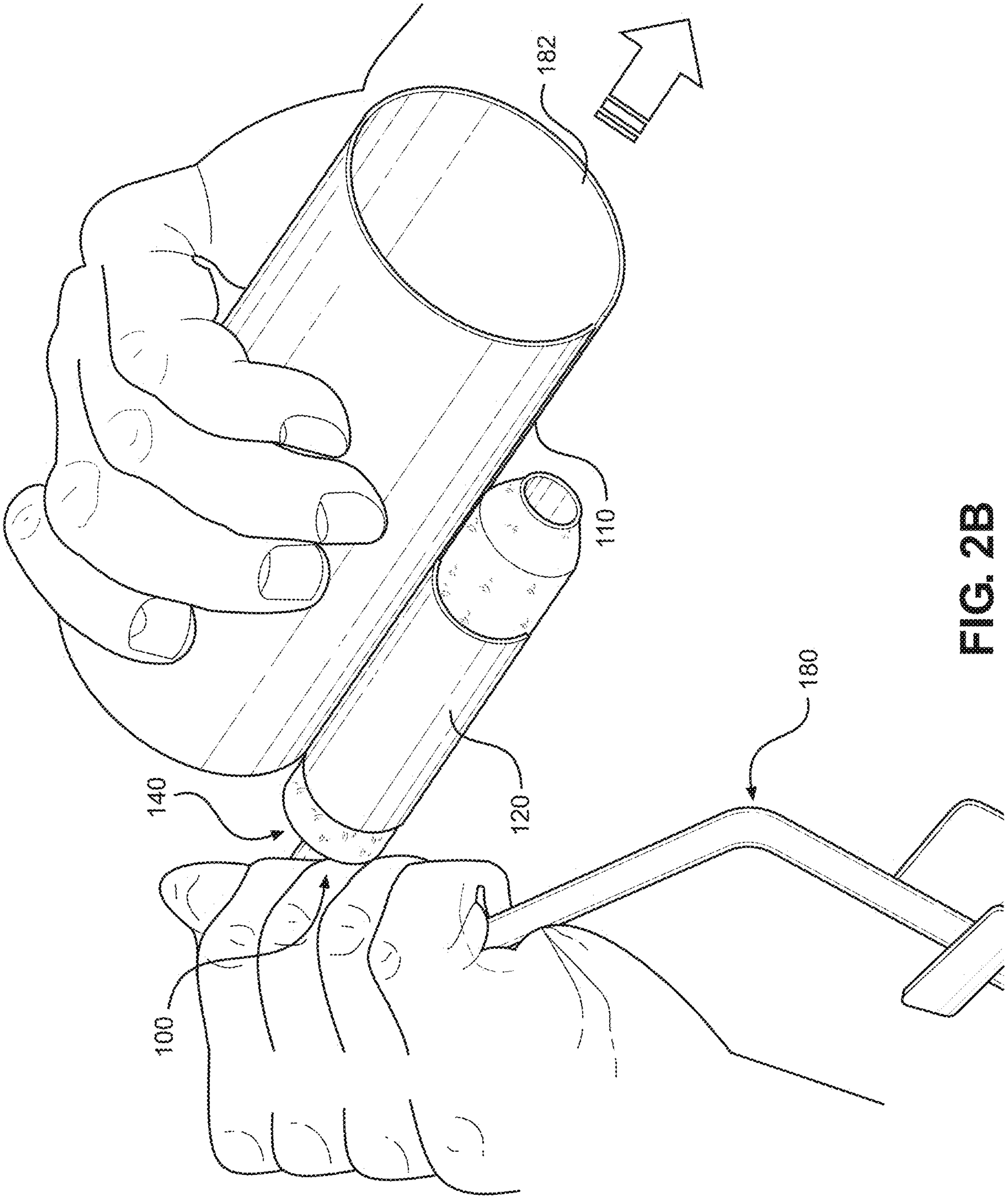
FIG. 2B shows an environmental perspective view of an embodiment of the paint roller sleeve removal tool in use with a relatively small paint roller.

Referring now to FIGS. 2A and 2B, there is a shown a perspective view of an embodiment of the paint roller sleeve removal tool 100 in use with a relatively large paint roller 142 and a perspective view of an embodiment of the paint roller sleeve removal tool 100 in use with a relatively small paint roller 144, respectively.

In one exemplary use, the paint roller sleeve removal tool 100 may be placed over a soiled paint roller sleeve 140 affixed to a roller cage 182 of a paint roller frame 180. The primary tubular member 110 may be contemplated for use with larger format paint rollers 142 (as shown in FIG. 2A), whereas the secondary tubular member 120 may be contemplated for use with relatively small paint rollers 144 (as shown in FIG. 2B). The paint roller sleeve removal tool 100 may be closed over the soiled paint roller sleeve 140, and the primary tubular member 110 may be gripped by the user. The user may then apply force along the longitudinal axis of the paint roller sleeve removal tool 100 to slide the soiled paint roller sleeve 140 off of the paint roller frame 180. The protrusions 130 may aid in gripping the paint roller sleeve 140, while the upper lip 160 and the lower lip 150 ensure that the user's hand is retained on the paint roller sleeve removal tool 100 during use. Once the soiled paint roller sleeve 140 is removed from the paint roller frame 180, the soiled paint roller sleeve 140 may be disposed of via opening the paint roller sleeve removal tool 100. In this manner, the user may efficiently remove soiled paint roller sleeves 140 while avoiding spreading paint to the user's hands or the surrounding area.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. A paint roller sleeve removal tool, comprising:

a primary tubular member having a first primary panel hingedly affixed to a second primary panel; and a secondary tubular member affixed to the primary tubular member, the secondary tubular member having a first secondary panel affixed to a distal end of the first primary panel and a second secondary panel affixed to a distal end of the second primary panel;

wherein the primary tubular member includes a widened first end and a widened second end;

wherein the widened first end and the widened second end are double-sided;

further comprising a lower lip extending radially outwardly from a lower edge of the first primary panel and the second primary panel;

further comprising an upper lip extending radially outwardly from an upper edge of each of the first primary panel and the second primary panel;

further comprising a plurality of protrusions is affixed to an interior surface of each of the first primary panel, the second primary panel, the first secondary panel, and the second secondary panel, respectively;

wherein the protrusions extend from the interior surface into a plurality of channels defined by the primary tubular member and the secondary tubular member; and wherein the protrusions are a plurality of protruding isosceles triangles that are equally spaced on the plurality of channels.

2. The paint roller sleeve removal tool, according to claim 1, wherein the first primary panel is hingedly affixed to the second primary panel with a screw inserted through a pair of extended apertures extending from the first primary panel and the second primary panel.

3. The paint roller sleeve removal tool, according to claim 1, wherein the secondary tubular member includes a widened first end and a widened second end that are double-sided.

4. The paint roller sleeve removal tool, according to claim 1, wherein the first secondary panel is affixed to the second secondary panel with a plurality of stationary living hinges.

5. The paint roller sleeve removal tool, according to claim 1, wherein the first primary panel and the second primary panel are each an arcuate panel.

6. The paint roller sleeve removal tool, according to claim 1, wherein the secondary tubular member comprises a diameter less than that of the primary tubular member, such that the paint roller sleeve removal tool provides the primary tubular member and the secondary tubular member adapted to be dimensioned for use with a roller cage of a paint roller frame having a plurality of diameters.

7. The paint roller sleeve removal tool, according to claim 1, wherein the protrusions aid in gripping the paint roller sleeve, while the upper lip and the lower lip ensure that the user's hand is retained on the paint roller sleeve removal tool during use.

8. The paint roller sleeve removal tool, according to claim 1, wherein the protrusions are distributed across the interior surface in a series of aligned columns.

* * * * *